United States Patent
Turtinen et al.

(10) Patent No.: US 12,520,351 B2
(45) Date of Patent: Jan. 6, 2026

(54) CONFIGURATION OF SMALL DATA TRANSMISSION

(71) Applicant: Nokia Technologies Oy, Espoo (FI)

(72) Inventors: Samuli Heikki Turtinen, Ii (FI); Jussi-Pekka Koskinen, Oulu (FI); Chunli Wu, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 19/093,382

(22) Filed: Mar. 28, 2025

(65) Prior Publication Data

US 2025/0227779 A1 Jul. 10, 2025

Related U.S. Application Data

(63) Continuation of application No. 18/271,289, filed as application No. PCT/CN2021/071776 on Jan. 14, 2021.

(51) Int. Cl.
*H04W 24/10* (2009.01)
*H04W 76/10* (2018.01)

(52) U.S. Cl.
CPC ........... *H04W 76/10* (2018.02); *H04W 24/10* (2013.01)

(58) Field of Classification Search
CPC .............................. H04W 76/10; H04W 24/10
See application file for complete search history.

(56) References Cited

U.S. PATENT DOCUMENTS

| | | | |
|---|---|---|---|
| 10,405,347 B2 | 9/2019 | Shi et al. | |
| 2017/0311278 A1* | 10/2017 | Adjakple | H04W 60/04 |
| 2019/0132778 A1 | 5/2019 | Park et al. | |
| 2019/0342848 A1 | 11/2019 | Zhang et al. | |
| 2019/0387440 A1 | 12/2019 | Yiu et al. | |
| 2021/0100040 A1 | 4/2021 | Bhardwaj et al. | |
| 2023/0189245 A1* | 6/2023 | Alfarhan | H04L 1/1854 370/329 |

FOREIGN PATENT DOCUMENTS

| | | |
|---|---|---|
| CN | 103391532 A | 11/2013 |
| CN | 111800888 A | 10/2020 |
| WO | 2019219752 A1 | 11/2019 |

OTHER PUBLICATIONS

Ericsson. "Details of CG based SDT.R2-2009964." 3GPP TSG-RAN WG2 #112e, Nov. 13, 2020 (Nov. 13, 2020), sections 1-2.
(Continued)

*Primary Examiner* — Chuong A Ngo
(74) *Attorney, Agent, or Firm* — Carter, DeLuca & Farrell LLP

(57) ABSTRACT

Example embodiments of the present disclosure relate to devices, methods, apparatuses and computer readable storage media for configuration of small data transmission. In example embodiments, a metric of mobility is determined in an inactive state. Based on the metric of mobility, one of a small data transmission procedure and a connection establishment procedure is selected for data transmission. Further, the selected one of the small data transmission procedure and the connection establishment procedure is initiated for the data transmission.

28 Claims, 3 Drawing Sheets

(56) References Cited

OTHER PUBLICATIONS

Intel Corporation. "SDT mechanism on RRC/non-RRC based approaches and RACH requirements. R2-2006713." 3GPP TSG RAN WG2 Meeting #111-e., Aug. 28, 2020 (Aug. 28, 2020), the whole document.

Samsung: "RACH based Small data transmission", 3GPP Draft; R2-132733_RACH_SMALLDATA_UPDATE, 3rd Generation Partnership Project (3GPP), Mobile Competence Centre; 650, Route Des Lucioles; F-06921 Sophia-Antipolis Cedex ; France vol. RAN WG2, No. Barcelona, Spain; Aug. 19, 2013-Aug. 23, 2013 Aug. 9, 2013 (Aug. 9, 2013), XP050718295, Retrieved from the Internet: URL:http://www.3gpp.org/ftp/tsg_ran/WG2_RL2/TSGR2_83/Docs/ [retrieved on Sep. 8, 2013] * p. 2.3.

OPPO: "Mobility state estimation issue during RRC state transition", 3GPP Draft; R2-1806957-Mobility State Estimation Issue During RRC State Transition, 3rd Generation Partnership Project (3GPP), Mobile Competence Centre; 650, Route Des Lucioles; F-06921 Sophia-Antip vol. RAN WG2, No. Busan, Korea; May 21, 2018-May 25, 2018 May 20, 2018 (May 20, 2018), XP051443391, Retrieved from the Internet: URL: http://www.3gpp.org/ftp/Meetings%5F3GPP%5FSYNC/RAN2/Docs/ [retrieved on May 20, 2018] * paragraph [0002].

Extended European Search Report issued by the European Patent Office in relation to European Application No. 21 918 369.6 dated Jun. 26, 2024 (9 pages).

Supplemental European Search Report issued by the European Patent Office in relation to European Application No. 21 91 8369 dated Jun. 17, 2024 (3 pages).

International Search Report and Written Opinion dated Oct. 12, 2021 corresponding to International Patent Application No. PCT/CN2021/071776.

3GPP TR 22.891 V14.2.0 (Sep. 2016), Technical Report, 3rd Generation Partnership Project; Technical Specification 3roup Services and System Aspects; Feasibility Study on New Services and Markets Technology Enablers; Stage 1 (Release 14), Sep. 2016.

3GPP TS 36.331 V16.3.0 (Dec. 2020), Technical Specification, 3rd Generation Partnership Project; Technical Specification Group Radio Access Network; Evolved Universal Terrestrial Radio Access {E-UTRA); Radio Resource Control {RRC); Protocol specification {Release 16), Dec. 2020.

International Preliminary Report on Patentability issued by the International Bureau of WIPO in relation to International Application No. PCT/CN2021/071776 dated Jul. 4, 2023 (5 pages).

Office Action for U.S. Appl. No. 18/271,289 dated Jul. 22, 2025, 12 pages.

* cited by examiner

CONFIGURATION OF SMALL DATA TRANSMISSION

CROSS-REFERENCE TO RELATED APPLICATIONS

This application is a continuation of U.S. patent application Ser. No. 18/271,289 filed Jul. 7, 2023 which is a national phase entry under 35 U.S.C. 371 of PCT International Application No. PCT/CN2021/071776 filed Jan. 14, 2021, the disclosure of each of these applications is expressly incorporated herein by reference in their entirety.

FIELD

Example embodiments of the present disclosure generally relate to the field of communications, and in particular, to devices, methods, apparatuses and computer readable storage media for configuration of small data transmission (SDT).

BACKGROUND

New Radio (NR) supports Radio Resource Control inactive (RRC_INACTIVE) state, and user equipment (UEs) with infrequent (periodic and/or non-periodic) data transmission are generally maintained by a network in the RRC_INACTIVE state. Until Release 16 (Rel-16), the RRC_INACTIVE state doesn't support data transmission. Hence, a UE has to resume the connection (for example, move to RRC_CONNECTED state) for any downlink (DL) or Mobile Terminate (MT) and uplink (UL) Mobile originate (MO) data. It happens for each data transmission that connection sets up and subsequently releases to INACTIVE state no matter how small and infrequent the data packets are. This results in unnecessary power consumption and signalling overhead.

Specific examples of small and infrequent data traffic may include use cases of smartphone applications and non-smartphone applications. The smartphone applications may including traffic from Instant Messaging (IM) services, heart-beat/keep-alive traffic from IM/email clients and other apps, and push notifications from various applications. The non-smartphone applications may include traffic from wearables such as periodic positioning information, sensors (such as Industrial Wireless Sensor Networks transmitting temperature, pressure readings periodically or in an event triggered manner, and smart meters and smart meter networks sending periodic meter readings.

The 3rd Generation Partnership Project (3GPP) standards such as 3GPP TS 22.891 specify that the NR system shall be efficient and flexible for low throughput short data bursts, support efficient signalling mechanisms (for example, signalling is less than payload), and reduce signalling overhead in general. Signalling overhead from INACTIVE state UEs for small data packets is a general problem and will become a critical issue with more UEs in NR not only for network performance and efficiency but also for the UE battery performance. In general, any device that has intermittent small data packets in INACTIVE state will benefit from enabling small data transmission in INACTIVE.

SUMMARY

In general, example embodiments of the present disclosure provide devices, methods, apparatuses and computer readable storage media for configuration of small data transmission (SDT).

In a first aspect, a device is provided which comprises at least one processor and at least one memory including computer program code. The at least one memory and the computer program code are configured to, with the at least one processor, cause the device to determine a metric of mobility in an inactive state. The device is caused to select, based on the metric of mobility, one of a small data transmission procedure and a connection establishment procedure for data transmission. The device is further caused to initiate the selected one of the small data transmission procedure and the connection establishment procedure for the data transmission.

In a second aspect, a device is provided which comprises at least one processor and at least one memory including computer program code. The at least one memory and the computer program code are configured to, with the at least one processor, cause the device to determine a configuration of a metric of mobility to enable a further device in an inactive state to select one of a small data transmission procedure and a connection establishment procedure for data transmission. The device is further caused to send, to the further device, an indication of the configuration of the metric of mobility.

In a third aspect, a method is provided. In the method, a metric of mobility is determined in an inactive state. Based on the metric of mobility, one of a small data transmission procedure and a connection establishment procedure is selected for data transmission. Further, the selected one of the small data transmission procedure and the connection establishment procedure is initiated for the data transmission.

In a fourth aspect, a method is provided. In the method, a configuration of a metric of mobility is determined to enable a further device in an inactive state to select one of a small data transmission procedure and a connection establishment procedure for data transmission. Further, an indication of the configuration of the metric of mobility is sent to the further device.

In a fifth aspect, there is provided an apparatus comprising means for performing the method according to the third or fourth aspect.

In a sixth aspect, there is provided a computer readable storage medium comprising program instructions stored thereon. The instructions, when executed by a processor of a device, cause the device to perform the method according to the third or fourth aspect.

It is to be understood that the summary section is not intended to identify key or essential features of example embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
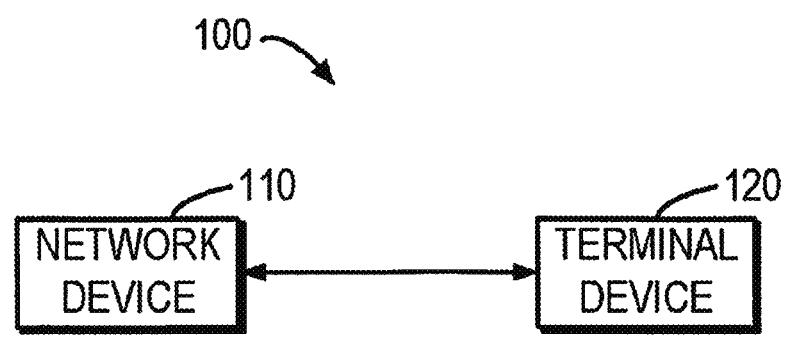
FIG. 1 illustrates an example environment in which example embodiments of the present disclosure can be implemented.

Principle of the present disclosure will now be described with reference to some example embodiments. It is to be understood that these example embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" or "user equipment" (UE) refers to any terminal device capable of wireless communications with each other or with the base station. The communications may involve transmitting and/or receiving wireless signals using electromagnetic signals, radio waves, infrared signals, and/or other types of signals suitable for conveying information over air. In some example embodiments, the UE may be configured to transmit and/or receive information without direct human interaction. For example, the UE may transmit information to the base station on predetermined schedules, when triggered by an internal or external event, or in response to requests from the network side.

Examples of the UE include, but are not limited to, smart phones, wireless-enabled tablet computers, laptop-embedded equipment (LEE), laptop-mounted equipment (LME), wireless customer-premises equipment (CPE), sensors, metering devices, personal wearables such as watches, and/or vehicles that are capable of communication. For the purpose of discussion, some example embodiments will be described with reference to UEs as examples of the terminal devices, and the terms "terminal device" and "user equipment" (UE) may be used interchangeably in the context of the present disclosure.

As used herein, the term "network device" refers to a device via which services can be provided to a terminal device in a communication network. As an example, the network device may comprise a base station. As used herein, the term "base station" (BS) refers to a network device via which services can be provided to a terminal device in a communication network. The base station may comprise any suitable device via which a terminal device or UE can access the communication network. Examples of the base stations include a relay, an access point (AP), a transmission point (TRP), a node B (NodeB or NB), an evolved NodeB (eNodeB or eNB), a New Radio (NR) NodeB (gNB), a Remote Radio Module (RRU), a radio header (RH), a remote radio head (RRH), a low power node such as a femto, a pico, and the like.

As used herein, the term "location server" refers to a device capable of providing location services. As an example, the location server may be implemented separately from the base station, as a device in a core network of the communication network, such as an Evolved Serving Mobile Location Center (E-SMLC). As another example, the location server may be integrated into the base station as a functional component of the base station.

As used herein, the term "positioning reference signal" (PRS) refers to any reference signal that can be used for the positioning purpose. Examples of the PRSs may DL PRSs transmitted by a network device to a terminal device, a UL SRS transmitted by a terminal device to a network device, or other PRSs of other types. In various embodiments of the present disclosure, the PRS may be configured in a periodic, semi-periodic or aperiodic or dynamic manner.

As used herein, the term "circuitry" may refer to one or more or all of the following:
  (a) hardware-only circuit implementations (such as implementations in only analog and/or digital circuitry) and
  (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
  (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in a server, a cellular base station, or other computing or base station.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As used herein, the terms "first", "second" and the like may be used herein to describe various elements, these elements should not be limited by these terms. These terms are only used to distinguish one element from another. For example, a first element could be referred to as a second element, and similarly, a second element could be termed a first element, without departing from the scope of example embodiments. As used herein, the term "and/or" includes any and all combinations of one or more of the listed terms.

The key enablers for small data transmission in NR, namely, the INACTIVE state, 2-step, 4-step Random Access Channel (RACH) and configured grant type-1 have already been specified as part of Rel-15 and Rel-16. In order to enable small data transmission in INACTIVE state for NR, in one aspect, UL small data transmissions for RACH-based schemes (such as 2-step and 4-step RACH) need to be enabled. In this aspect, a general procedure is needed to enable user plane (UP) data transmission for small data packets from INACTIVE state, for example, using MSGA or MSG3, and flexible payload sizes need to be enabled which may be larger than a Rel-16 Common Control Channel (CCCH) message size that is possible currently for INACTIVE state for MSGA and MSG3 to support UP data transmission in UL. The actual payload size can be up to network configuration. Context fetch and data forwarding (with and without anchor relocation) need to be provided in INACTIVE state for RACH-based solutions.

In another aspect, transmission of UL data on pre-configured Physical Uplink Shared Channel (PUSCH) resources (for example, reusing the configured grant type 1) needs to be allowed when a tracking area (TA) is valid. For example, a general procedure is needed for small data transmission over configured grant type 1 resources from INACTIVE state. Grant type1 resources for small data transmission in UL need to be configured for INACTIVE state.

Transmission of small data in UL, subsequent transmission of small data in UL and DL and the state transition decisions may be under the control of the network. The design for transmission of small data may be focused on licensed carriers and may be reused for NR Unlicensed (NR-U) if applicable.

It has been agreed that NR will support sending multiple UL/DL packets during a Small Data Transmission (SDT) procedure with neither transitioning the UE into RRC_CONNECTED state in between nor performing separate SDT procedures for those transmissions. Beam failure detection and recovery is only supported in RRC_CONNECTED mode in NR as well as the beam management functions. This means that the subsequent SDT transmissions would need to be conveyed using the beam that the UE indicates with the first SDT transmission in a Random Access procedure. With UE mobility during the SDT procedure, which may last much longer than regular RRC connection establishment, the beam may drift, and the UE cannot receive communication anymore via the beam that it indicated over the RA procedure.

Therefore, it would be beneficial that (high) moving UEs would not trigger a SDT procedure, but regular connection establishment leads to RRC_CONNECTED state where beam management is already possible.

Preconfigured uplink resource (PUR) in Long Term Evolution (LTE) allows one uplink transmission from RRC_IDLE using a preconfigured uplink resource without a random access procedure. The PUR is only valid in a cell where the corresponding configuration is received. Transmission using PUR is triggered when upper layers request the establishment or resumption of the RRC Connection and the UE has a valid PUR for transmission and meets the TA validation criteria as specified in the 3GPP standards such as TS 36.331 as below:

5.3.3.19 Timing Alignment Validation for Transmission Using PUR

A UE shall consider the timing alignment value for transmission using PUR to be valid when all of the following conditions are fulfilled:
        1> if pur-TimeAlignmentTimer is configured:
            2> pur-TimeAlignmentTimer is running as confirmed by lower layers;
        1> if pur-RSRP-ChangeThreshold (pur-NRSRP-ChangeThreshold in NB-IoT) is configured:
            2> since the last TA validation, the serving cell (N)RSRP has not increased by more than increaseThresh; and
            2> since the last TA validation, the serving cell (N)RSRP has not decreased by more than decreaseThresh;

For NR Configured Grant (CG) based SDT, beam validation was discussed, but not considered for RACH based SDT since the UE can use any beam in the cell via RACH.

Example embodiments of the present disclosure provide an SDP initiation scheme to consider UE mobility information during an INACTIVE state. The mobility information may be any information that can reflect the UE mobility, including, for example, information related to beam changes, cell changes and/or velocity. This scheme requires determining a metric of mobility when determining, in an INACTIVE mode, whether to initiate SDT or to perform regular connection establishment. The metric of mobility may include a count of beam changes, a count of cell changes or velocity. Based on the metric of mobility, one of a SDT procedure and a connection establishment procedure is selected and then initiated for data transmission.

Accordingly, the initiation of a SDT procedure may take the mobility of a device such as a UE into account. For example, the SDT procedure may be initiated when the device is moving relatively slower, for example, there has not been many or frequent beam and/or cell changes, which makes SDT more reliable. If there have been many or frequent beam and/or cell changes which enables beam management, regular RRC connection establishment leading to RRC CONNECTED may be initiated. As such, there is no need to define beam management procedures for RRC INACTIVE while providing more reliable mobility management in a CONNECTED mode when needed to avoid data loss FIG. 1 shows an example environment 100 in which example embodiments of the present disclosure can be implemented.

The environment 100, which may be a part of a communication network, comprises a network device 110 and a terminal device 120 that can communicate with each other. It is to be understood that two devices are shown in the environment 100 only for the purpose of illustration, without suggesting any limitation to the scope of the present disclosure. In some example embodiments, the environment 100 may comprise any suitable numbers of network devices and terminal devices.

The communications in the environment 100 may follow any suitable communication standards or protocols, which are already in existence or to be developed in the future, such as Universal Mobile Telecommunications System (UMTS), long term evolution (LTE), LTE-Advanced (LTE-A), the fifth generation (5G) New Radio (NR), Wireless Fidelity (Wi-Fi) and Worldwide Interoperability for Microwave Access (WiMAX) standards, and employs any suitable communication technologies, including, for example, Multiple-Input Multiple-Output (MIMO), Orthogonal Frequency Division Multiplexing (OFDM), time division multiplexing (TDM), frequency division multiplexing (FDM), code division multiplexing (CDM), Bluetooth, ZigBee, and machine type communication (MTC), enhanced mobile broadband (eMBB), massive machine type communication (mMTC), ultra-reliable low latency communication (URLLC), Carrier Aggregation (CA), Dual Connection (DC), and New Radio Unlicensed (NR-U) technologies.

In the environment 100, when the terminal device 120 is an inactive state, the terminal device 120 may count beam changes or cell changes, detect the velocity, or monitor other mobility measurements as a metric of mobility. When the terminal device 120 has data to be transmitted, the terminal device 120 can select, based the metric of mobility, either a SDT procedure or a connection establishment procedure for data transmission.

The network device 110 can implement the corresponding configuration functions. In some example embodiments, the network device 110 may determine a configuration of a metric of mobility and send an indication of the configuration to the terminal device 120 such that the terminal device 120 can use this configuration in selecting either a SDT or connection establishment procedure for data transmission.

In this way, device mobility may be considered when determine whether to initiate SDT or regular connection establishment for data transmission, thereby improving data transmission efficiency.

It is to be understood that it is only illustrative, but not limited that the SDT procedure and the corresponding configuration function are performed by the terminal device 120 and the network device 110, respectively. In some example embodiments, some of the SDT configuration function of the network device 110 may be implemented by another terminal device or a relay. In some example embodiments, a relay may monitor its mobility metric and further initiate either a SDT or connection establishment procedure selected based on the mobility metric. Only for the purpose of discussion, some example embodiments will be discussed in the scenario where a terminal device performs the initiation of the SDT procedure and/or the connection establishment procedure and a network device performs the corresponding configuration function.

Figure 2:
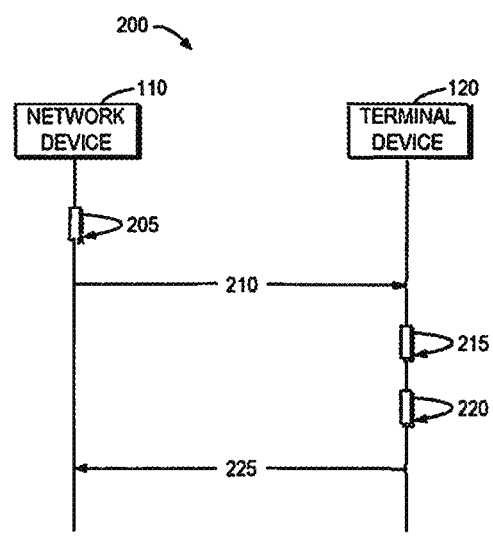
FIG. 2 illustrates a signaling flow according to some example embodiments of the present disclosure.

FIG. 2 shows a signaling flow 200 between the network device 110 and the terminal device 120 according to some example embodiments of the present disclosure.

As shown in FIG. 2, the network device 110 determines (205) a configuration for a metric of mobility for the terminal device 120 in an inactive state to select one of a SDT procedure and a connection establishment procedure for data transmission. The metric of mobility may be any metric that can reflect the mobility of the terminal device 120. For example, in some example embodiments, the metric of mobility may comprise beam changes. Accordingly, the terminal device 120 counts the beam changes when in an inactive state such as a RRC_INACTIVE state.

The configuration may comprise any suitable information related to the metric of mobility. For example, the configuration may indicate a specific metric of mobility that the terminal device 120 needs to measure, detect or monitor. The configuration may further indicate the selection rule or criteria of the SDT and connection establishment procedure (such as a RRC connection establishment procedure) for data transmission in an inactive state.

For example, in the example embodiments where the metric of mobility comprise a count of beam changes, the selection rule may be whether the terminal device 120 has counted beam changes or counted more beam changes than a configured threshold count. If the terminal device 120 has counted beam changes or more beam changes, the terminal device 120 needs to initiate a regular RRC connection establishment instead of a SDT procedure. Alternatively or in addition, the selection rule may be whether the terminal device 120 has experienced a certain number of beam changes during a certain amount of time. If the terminal device 120 has experienced a certain number of beam changes during a certain amount of time, the terminal device 120 is not allowed to start the SDT procedure and regular RRC connection establishment will be attempted instead.

Alternatively or in addition, in the case that a threshold count is used for the selection rule, the configuration may include the definition or configuration of the threshold count. For example, the configuration may include a threshold count of beam changes since a last connection release message (such as a RRC Release message) is received, to indicate to the terminal device 120 that the beam changes need to be counted since receiving the last connection release message.

Alternatively or in addition, the configuration may indicate whether the beam changes are counted during certain amount of time. For example the configuration may include a threshold count of beam during a period of time before the selection of the SDT or connection establishment procedure for data transmission. As such, the terminal device 120 may determine that that the beam changes need to be counted during a specific period of time. Alternatively or in addition, the configuration may indicate whether the beam changes are counted within a single cell or over multiple cells.

In some example embodiments, the configuration may indicate the terminal device 120 to report the determined count of beam changes in regular connection establishment. As such, the network device 110 may know the reason why the terminal device 120 starts the regular connection establishment procedure instead of the SDT procedure. The network device 110 may use the count of beam changes to determine whether the regular connection establishment or the SDT scheme should be used.

In some example embodiments, the configuration for the metric of mobility may indicate its validity time. For example, the configuration may indicate whether this configuration is valid for subsequent data transmission, or whether the configuration is valid for SDT for current data transmission or for SDT where subsequent data transmission is expected/assumed.

After determining (205) the configuration for the metric of mobility, the network device 110 sends (210) an indication of the configuration to the terminal device 120. In some embodiments, the configuration may be sent from the network device 110 to the terminal device 120 in dedicated or broadcast signaling. For example, the dedicated signaling may comprise a connection release message such as a RRC Release message or other messages or signaling specific to the terminal device 120. The broadcast signaling may comprise a system message such as a system information block (SIB) or other messages or signaling broadcast to a group of devices.

Accordingly, the terminal device 120 determines (215) the metric of mobility when in an inactive state. For example, if the terminal device 120 is configured to count the beam changes, the terminal device 120 may count the beam changes within a single cell or over multiple cells and/or during certain amount of time.

In some embodiments, the configuration for the metric of mobility may be fixed or predefined at the beginning when the terminal device 120 is connected to the network. In this case, the network device 110 does not need to determine and send the configuration to the terminal device 120. In some other embodiments, the terminal device 120 may autonomously determine the rule for the metric of mobility and reports the rule to the network device 110.

Based on the determined metric of mobility, the terminal device 120 selects (220) one of a SDT procedure and a connection establishment procedure for data transmission. For example, in the example embodiments where the selection criteria is based on comparison of a count of beam changes and a threshold count, the terminal device 120 determines whether the count of beam changes is above the threshold count. If yes, the terminal device 120 selects the connection establishment procedure for the data transmission. Otherwise, the terminal device 120 selects the SDT procedure. Thus, when the terminal device 120 is moving fast, the terminal device 120 will not trigger a SDT procedure, but trigger a regular connection establishment procedure that leads to a connected state (such as a RRC_CONNECTED state) where beam management is already possible. Thereby, the data transmission efficiency may be improved.

Then, the terminal device 120 initiates (225) the selected SDT or connection establishment procedure with the network device 110 for data transmission. In some example embodiments, the device for performing the configuration function and the device for performing the selected procedure with the terminal device 120 may be different depending on the specific implementations. For example, the selected procedure may be performed between the terminal device 120 and other devices than the network device 110.

In the case that the connection establishment procedure is selected, the terminal device 120 may initiate the connection establishment procedure by initiating a resume procedure, an establishment procedure and/or a re-establishment procedure. The connection establishment procedure may be triggered by sending a connection establishment request message. For example, the terminal device 120 may use a RRCResumeRequest message to initiate a RRC Resume procedure, use a RRCSetupRequest message to initiate a RRC Setup procedure, or use a RRCReestablishmentRequest message to initiate a RRC re-establishment procedure.

In some example embodiments, the request message may indicate the count of beam changes. For example, the request message may be extended to include information about the beam change count. A new field may be defined or an existing filed may be reused in the request message to carry the information. Accordingly, the network device 110 or other network entities or functions can use this information to determine whether regular connection establishment or a SDT scheme should be used.

In some example embodiments, the terminal device 120 may log a connection establishment event about the metric of mobility. For example, in the example embodiments where the connection establishment procedure is selected based on the comparison of the count of beam changes and a threshold count, the terminal device 120 may log a connection establishment event that the count of beam changes is above the threshold count to indicate that SDT is not utilized due to beam changes. In some example embodiments, the terminal device 120 may report such events to the network side, for example, as part of Minimization of Drive Test (MDT) reports.

It is to be understood that in addition to beam level mobility, other mobility may also be considered such as cell level mobility or velocity level mobility. For example, the measurement and selection rules with respect to the beam changes as discussed above could be applicable to cell level mobility. As an example, the number of cell changes may be counted by the terminal device 120 to determine whether to trigger a SDT procedure for data transmission.

Figure 3:
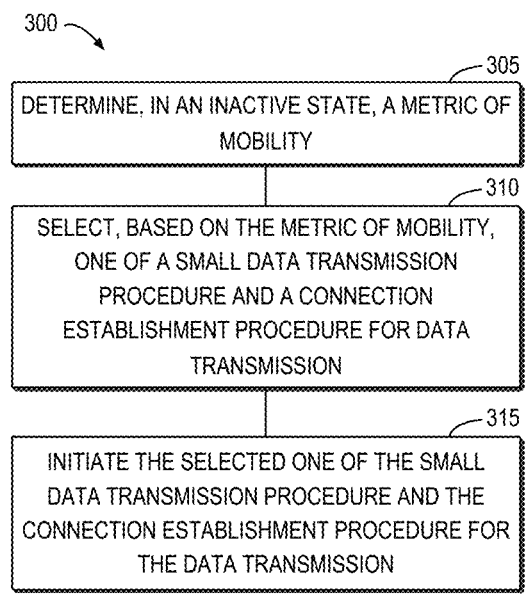
FIG. 3 illustrates a flowchart of an example method according to some example embodiments of the present disclosure.

FIG. 3 shows a flowchart of an example method 300 according to some example embodiments of the present disclosure. The method 300 may be implemented by the terminal device 120 or any other devices that has data to be transmitted when in an inactive state. For the purpose of discussion, the method 300 will be described with reference to FIG. 1.

At block 305, the terminal device 120 in an inactive state determines a metric of mobility. The metric of mobility may comprise any metric that can reflect the mobility of terminal device 120, including, for example, a count of beam changes, a count of cell changes, velocity or the like.

In some embodiments, the metric of mobility may be determined based on a configuration from a network side. For example, the terminal device 120 may receive a configuration for the metric of mobility from the network device 110 or any other devices that can configure the mobility measurement for another device in an inactive state. The configuration may be received by the terminal device 120 in dedicated signaling such as a RRC release message or broadcast signaling such as a SIB or any other messages or signaling.

The configuration for the metric of mobility may comprise any suitable information related to the metric of mobility. In some example embodiments, the configuration may include a threshold count of beam changes since a last RRC connection release message is received and/or a threshold count of beam during a period of time before selecting one of a small data transmission procedure and a connection establishment procedure for data transmission. In some example embodiments, the configuration may indicate that the count of beam changes is to be reported in a connection establishment procedure, and/or whether the configuration is valid for further subsequent data transmission.

In some other example embodiments, the configuration may be fixed or predefined. Alternatively or in addition, the terminal device 120 may autonomously determine the measurement rule for the metric of mobility.

The metric of mobility may be determined by the terminal device 120 based any suitable rule. For example, in the example embodiments where a count of beam changes act as the metric of mobility, the terminal device 120 may count beam changes within a single cell or over a plurality of cells and/or during certain amount of time.

Based on the determined metric of mobility, at block 310, the terminal device 120 selects one of a SDT procedure and a connection establishment procedure for data transmission. For example, in the example embodiments where the selection is performed based on comparison of a count of beam changes and a threshold count, the terminal device 120 may determine whether the count of beam changes is above the threshold count and select the connection establishment procedure for the data transmission if the count of beam changes is above the threshold count.

Then, at block 315, the terminal device 120 initiates the selected procedure for the data transmission. In the example embodiments where the connection establishment procedure is selected, the terminal device 120 may initiate the connection establishment procedure by initiating a resume procedure, an establishment procedure and/or a re-establishment procedure. In some example embodiments, the terminal device 120 may send a connection establishment request message to initiate the connection establishment procedure, and the request message may indicate the determined metric of mobility such as the count of beam changes. Based on this count of beam changes, the network can determine whether regular connection establishment or SDT scheme should be used in the further and may further perform the corresponding configuration operation.

In some example embodiments, the terminal device 120 may log a connection establishment event about the metric of mobility. For example, in the example embodiments where the connection establishment procedure is selected due to beam changes, the terminal device 120 may log a connection establishment event that the count of beam changes is above the threshold count. The connection establishment event may reported by the terminal device 120 as part of MDT reports. Accordingly, the network may know that the SDT scheme cannot be triggered due to the beam changes and may further adjust the SDT configurations.

Figure 4:
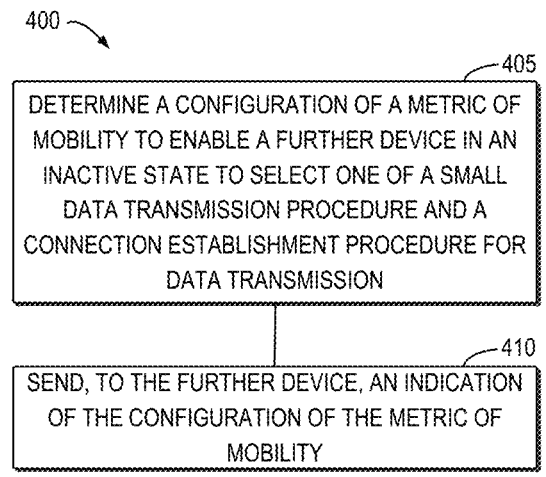
FIG. 4 illustrates a flowchart of an example method according to some other example embodiments of the present disclosure.

FIG. 4 shows a flowchart of an example method 400 according to some example embodiments of the present disclosure. The method 400 may be implemented by the network device 110 or any other devices that can configure the mobility measurement for another device in an inactive state. For the purpose of discussion, the method 400 will be described with reference to FIG. 1.

At block 405, the network device 110 determines a configuration of a metric of mobility to enable the terminal device 120 in an inactive state to select one of a SDT procedure and a connection establishment procedure for data transmission. The metric of mobility may comprise a count of beam changes, a count of cell changes, velocity or any other metrics that can reflect the mobility of the terminal device 120. The configuration for the metric of mobility may comprise any related configuration, including, for example, a threshold count of beam changes since a last RRC connection release message is received and/or a threshold count of beam during a period of time before selecting one of a small data transmission procedure and a connection establishment procedure for data transmission, an indication that the count of beam changes is to be reported in a connection establishment procedure, and/or an indication whether the configuration is valid for further subsequent data transmission.

At block 410, the network device 110 sends an indication of the configuration of the metric of mobility to the terminal device 120. The configuration may be sent by the network device 110 in any suitable messages or signaling, including, for example, dedicated signaling such as a RRC release message or broadcast signaling such as a SIB.

In some example embodiments, if the terminal device 120 selects the connection establishment procedure, the network device 110 may receive from the terminal device 120 a connection establishment request message that indicates the metric of mobility such as the count of beam changes determined by the terminal device 110. In some example embodiments, the network device 110 may receive, from the terminal device 110, a report of a connection establishment event to indicate that the SDT procedure cannot be utilized due to the mobility of the terminal device 120, for example, because the count of beam changes is above a threshold count in the case that the count of beam changes acts as the metric of mobility.

All operations and features as described above with reference to FIGS. 1 and 2 are likewise applicable to the methods 300 and 400 and have similar effects. For the purpose of simplification, the details will be omitted.

Figure 5:
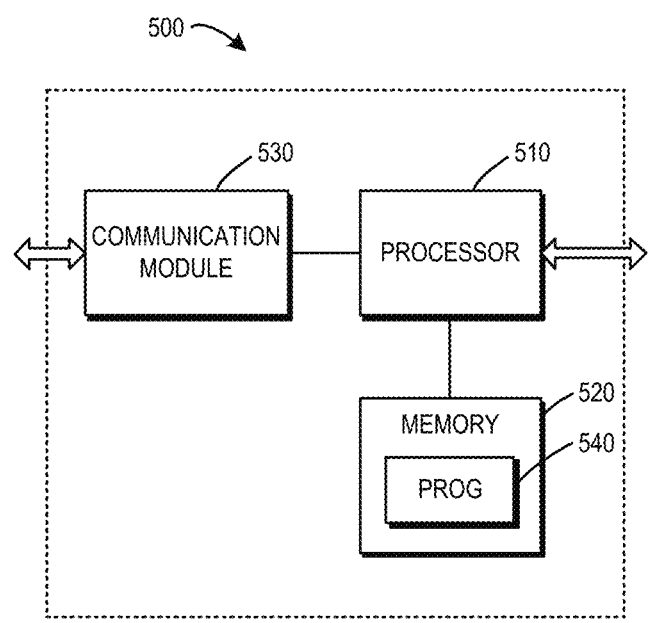
FIG. 5 illustrates a simplified block diagram of a device that is suitable for implementing example embodiments of the present disclosure.

FIG. 5 is a simplified block diagram of a device 500 that is suitable for implementing example embodiments of the present disclosure.

As shown, the device 500 includes a processor 510, a memory 520 coupled to the processor 510, a communication module 530 coupled to the processor 510, and a communication interface (not shown) coupled to the communication module 530. The memory 520 stores at least a program 540. The communication module 530 is for bidirectional communications, for example, via multiple antennas. The communication interface may represent any interface that is necessary for communication.

The program 540 is assumed to include program instructions that, when executed by the associated processor 510, enable the device 500 to operate in accordance with the example embodiments of the present disclosure, as discussed herein with reference to FIGS. 1-5. The example embodiments herein may be implemented by computer software executable by the processor 510 of the device 500, or by hardware, or by a combination of software and hardware. The processor 510 may be configured to implement various example embodiments of the present disclosure.

The memory 520 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 520 is shown in the device 500, there may be several physically distinct memory modules in the device 500. The processor 510 may be of any type suitable to the local technical network, and may include one or more of general purpose computers, special purpose computers, microprocessors, digital signal processors (DSPs) and processors based on multicore processor architecture, as non-limiting examples. The device 500 may have multiple processors, such as an application specific integrated circuit chip that is slaved in time to a clock which synchronizes the main processor.

When the device 500 acts as a device that has data to be transmitted when in an inactive state, the processor 510 and the communication module 530 may cooperate to implement the method 300 as described above with reference to FIGS. 1-3. When the device 500 acts as a device that can configure the mobility measurement for another device in an inactive mode, the processor 510 and the communication module 530 may cooperate to implement the method 500 as described above with reference to FIGS. 1-3 and 4. All operations and features as described above with reference to FIGS. 1-4 are likewise applicable to the device 500 and have similar effects. For the purpose of simplification, the details will be omitted.

Generally, various example embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of example embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 300 or 400 as described above with reference to FIGS. 1-4. Generally, program modules include routines, programs, libraries, objects, classes, components, data structures, or the like that perform particular tasks or implement particular abstract data types. The functionality of the program modules may be combined or split between program modules as desired in various example embodiments.

Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), Digital Versatile Disc (DVD), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular example embodiments. Certain features that are described in the context of separate example embodiments may also be implemented in combination in a single embodiment. Conversely, various features that are described in the context of a single embodiment may also be implemented in multiple example embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

Various example embodiments of the techniques have been described. In addition to or as an alternative to the above, the following examples are described. The features described in any of the following examples may be utilized with any of the other examples described herein.

In some aspects, a device comprises: at least one processor; and at least one memory including computer program code; the at least one memory and the computer program code configured to, with the at least one processor, cause the device to: determine, in an inactive state, a metric of mobility; select, based on the metric of mobility, one of a small data transmission procedure and a connection establishment procedure for data transmission; and initiate the selected one of the small data transmission procedure and the connection establishment procedure for the data transmission.

In some example embodiments, the device is caused to determine the metric of mobility by: receiving an indication of a configuration for the metric of mobility; and determining the metric of mobility based on the configuration.

In some example embodiments, the configuration for the metric of mobility is received in at least one of dedicated or broadcast signaling.

In some example embodiments, the metric of mobility comprises a count of beam changes, and the configuration for the metric of mobility including at least one of: a threshold count of beam changes since a last connection release message is received; a threshold count of beam changes during a period of time before selecting one of a small data transmission procedure and a connection establishment procedure for data transmission; an indication that the count of beam changes is to be reported in a connection establishment procedure; or an indication whether the configuration is valid for subsequent data transmission.

In some example embodiments, the device is caused to determine the metric of mobility based on the configuration by: counting beam changes within a single cell or over a plurality of cells.

In some example embodiments, the device is caused to select the one of the small data transmission procedure and the connection establishment procedure by: determining whether the count of beam changes is above a threshold count; and in accordance with a determination that the count of beam changes is above the threshold count, selecting the connection establishment procedure for the data transmission.

In some example embodiments, the device is caused to initiate the connection establishment procedure by initiating at least one of a resume procedure, an establishment procedure or a re-establishment procedure.

In some example embodiments, the device is caused to initiate the connection establishment procedure by: sending a connection establishment request message, the connection establishment request message indicating the count of beam changes.

In some example embodiments, the device is further caused to: log a connection establishment event that the count of beam changes is above the threshold count.

In some example embodiments, the metric of mobility comprises at least one of a count of beam changes, a count of cell changes or velocity.

In some aspects, a device comprises: at least one processor; and at least one memory including computer program code; the at least one memory and the computer program code configured to, with the at least one processor, cause the device to: determine a configuration of a metric of mobility to enable a further device in an inactive state to select one of a small data transmission procedure and a connection establishment procedure for data transmission; and send, to the further device, an indication of the configuration of the metric of mobility.

In some example embodiments, the configuration for the metric of mobility is sent in at least one of a dedicated or broadcast signaling.

In some example embodiments, the metric of mobility comprises a count of beam changes, and the configuration for the metric of mobility includes at least one of: a threshold count of beam changes since a last connection release message is received; a threshold count of beam during a period of time before selecting one of a small data transmission procedure and a connection establishment procedure for data transmission; an indication that the count of beam changes is to be reported in a connection establishment procedure; or an indication whether the configuration is valid for subsequent data transmission.

In some example embodiments, the device is further caused to: receive, from the further device, a connection establishment request message, the connection establishment request message indicating the count of beam changes.

In some example embodiments, the device is further caused to: receive, from the further device, a report of a connection establishment event that the count of beam changes is above a threshold count.

In some aspects, a method comprises: determining, in an inactive state, a metric of mobility; selecting, based on the metric of mobility, one of a small data transmission procedure and a connection establishment procedure for data transmission; and initiating the selected one of the small data transmission procedure and the connection establishment procedure for the data transmission.

In some example embodiments, determining the metric of mobility comprises: receiving an indication of a configuration for the metric of mobility; and determining the metric of mobility based on the configuration.

In some example embodiments, the configuration for the metric of mobility is received in at least one of dedicated or broadcast signaling.

In some example embodiments, the metric of mobility comprises a count of beam changes, and the configuration for the metric of mobility including at least one of: a threshold count of beam changes since a last connection release message is received; a threshold count of beam during a period of time before selecting one of a small data transmission procedure and a connection establishment procedure for data transmission; an indication that the count of beam changes is to be reported in a connection establishment procedure; or an indication whether the configuration is valid for subsequent data transmission.

In some example embodiments, determining the metric of mobility based on the configuration comprises: counting beam changes within a single cell or over a plurality of cells.

In some example embodiments, selecting the one of the small data transmission procedure and the connection establishment procedure comprises: determining whether the count of beam changes is above a threshold count; and in accordance with a determination that the count of beam changes is above the threshold count, selecting the connection establishment procedure for the data transmission.

In some example embodiments, initiating the connection establishment procedure by initiating at least one of a resume procedure, an establishment procedure or a re-establishment procedure.

In some example embodiments, initiating the connection establishment procedure comprises: sending a connection establishment request message, the connection establishment request message indicating the count of beam changes.

In some example embodiments, the method further comprises: logging a connection establishment event that the count of beam changes is above the threshold count.

In some example embodiments, the metric of mobility comprises at least one of a count of beam changes, a count of cell changes or velocity.

In some aspects, a method comprises: determining a configuration of a metric of mobility to enable a device in an inactive state to select one of a small data transmission procedure and a connection establishment procedure for data transmission; and sending, to the device, an indication of the configuration of the metric of mobility.

In some example embodiments, the configuration for the metric of mobility is sent in at least one of a dedicated or broadcast signaling.

In some example embodiments, the metric of mobility comprises a count of beam changes, and the configuration for the metric of mobility includes at least one of: a threshold count of beam changes since a last connection release message is received; a threshold count of beam during a period of time before selecting one of a small data transmission procedure and a connection establishment procedure for data transmission; an indication that the count of beam changes is to be reported in a connection establishment procedure; or an indication whether the configuration is valid for subsequent data transmission.

In some example embodiments, the method further comprises: receiving, from the device, a connection establishment request message, the connection establishment request message indicating the count of beam changes.

In some example embodiments, the method further comprises: receiving, from the device, a report of a connection establishment event that the count of beam changes is above a threshold count.

In some aspects, an apparatus comprises: means for determining, in an inactive state, a metric of mobility; means for selecting, based on the metric of mobility, one of a small data transmission procedure and a connection establishment procedure for data transmission; and means for initiating the selected one of the small data transmission procedure and the connection establishment procedure for the data transmission.

In some example embodiments, the means for determining the metric of mobility comprises: means for receiving an indication of a configuration for the metric of mobility; and means for determining the metric of mobility based on the configuration.

In some example embodiments, the configuration for the metric of mobility is received in at least one of dedicated or broadcast signaling.

In some example embodiments, the metric of mobility comprises a count of beam changes, and the configuration for the metric of mobility including at least one of: a threshold count of beam changes since a last connection release message is received; a threshold count of beam during a period of time before selecting one of a small data transmission procedure and a connection establishment procedure for data transmission; an indication that the count of beam changes is to be reported in a connection establishment procedure; or an indication whether the configuration is valid for subsequent data transmission.

In some example embodiments, the means for determining the metric of mobility based on the configuration comprises: means for counting beam changes within a single cell or over a plurality of cells.

In some example embodiments, the means for selecting the one of the small data transmission procedure and the connection establishment procedure comprises: means for determining whether the count of beam changes is above a threshold count; and means for in accordance with a determination that the count of beam changes is above the threshold count, selecting the connection establishment procedure for the data transmission.

In some example embodiments, the means for initiating the connection establishment procedure comprises means for initiating at least one of a resume procedure, an establishment procedure or a re-establishment procedure.

In some example embodiments, the means for initiating the connection establishment procedure comprises: means for sending a connection establishment request message, the connection establishment request message indicating the count of beam changes.

In some example embodiments, the apparatus further comprises: means for logging a connection establishment event that the count of beam changes is above the threshold count.

In some example embodiments, the metric of mobility comprises at least one of a count of beam changes, a count of cell changes or velocity.

In some aspects, an apparatus comprises: means for determining a configuration of a metric of mobility to enable a device in an inactive state to select one of a small data transmission procedure and a connection establishment procedure for data transmission; and means for sending, to the device, an indication of the configuration of the metric of mobility.

In some example embodiments, the configuration for the metric of mobility is sent in at least one of a dedicated or broadcast signaling.

In some example embodiments, the metric of mobility comprises a count of beam changes, and the configuration for the metric of mobility includes at least one of: a threshold count of beam changes since a last connection release message is received; a threshold count of beam during a period of time before selecting one of a small data transmission procedure and a connection establishment procedure for data transmission; an indication that the count of beam changes is to be reported in a connection establishment procedure; or an indication whether the configuration is valid for subsequent data transmission.

In some example embodiments, the means for further comprises: means for receiving, from the device, a connection establishment request message, the connection establishment request message indicating the count of beam changes.

In some example embodiments, the apparatus further comprises: means for receiving, from the device, a report of a connection establishment event that the count of beam changes is above a threshold count.

In some example embodiments, the metric of mobility comprises at least one of a count of beam changes, a count of cell changes or velocity.

In some aspects, a computer readable storage medium comprises program instructions stored thereon, the instructions, when executed by a processor of a device, causing the device to perform the method according to some example embodiments of the present disclosure.

What is claimed is:

1. A device comprising:
   at least one processor; and
   at least one memory including computer program code;
   the at least one memory and the computer program code configured to, with the at least one processor, cause the device to:
   determine, in an inactive state, a metric of mobility;
   select, based on the metric of mobility, one of a small data transmission procedure or a connection establishment procedure for data transmission; and
   initiate the selected one of the small data transmission procedure or the connection establishment procedure for the data transmission,
   wherein the device is caused to determine the metric of mobility by:
   receiving an indication of a configuration for the metric of mobility; and
   determining the metric of mobility based on the configuration, and
   wherein the metric of mobility comprises a count of beam changes, and the configuration for the metric of mobility including at least one of:
   a threshold count of beam changes since a last connection release message is received;
   a threshold count of beam changes during a period of time before selecting one of a small data transmission procedure and a connection establishment procedure for data transmission;
   an indication that the count of beam changes is to be reported in a connection establishment procedure; or
   an indication whether the configuration is valid for subsequent data transmission.

2. The device of claim 1, wherein the configuration for the metric of mobility is received in at least one of dedicated or broadcast signaling.

3. The device of claim 1, wherein the configuration for the metric of mobility includes:
   the threshold count of beam changes since a last connection release message is received.

4. The device of claim 1, wherein the device is caused to determine the metric of mobility based on the configuration by:
   counting beam changes within a single cell or over a plurality of cells.

5. The device of claim 1, wherein the device is caused to select the one of the small data transmission procedure and the connection establishment procedure by:
   determining whether the count of beam changes is above a threshold count; and
   in accordance with a determination that the count of beam changes is above the threshold count, selecting the connection establishment procedure for the data transmission.

6. The device of claim 5, wherein the device is caused to initiate the connection establishment procedure by initiating at least one of a resume procedure, an establishment procedure or a re-establishment procedure.

7. The device of claim 5, wherein the device is caused to initiate the connection establishment procedure by:
   sending a connection establishment request message, the connection establishment request message indicating the count of beam changes.

8. The device of claim 5, wherein the device is further caused to:
   log a connection establishment event that the count of beam changes is above the threshold count.

9. The device of claim 1, wherein the metric of mobility further comprises at least one of a count of cell changes or velocity.

10. A device comprising:
at least one processor; and
at least one memory including computer program code;
the at least one memory and the computer program code configured to, with the at least one processor, cause the device to:
determine a configuration of a metric of mobility to enable a further device in an inactive state to select one of a small data transmission procedure and a connection establishment procedure for data transmission; and
send, to the further device, an indication of the configuration of the metric of mobility,
wherein the metric of mobility comprises a count of beam changes, and the configuration for the metric of mobility includes at least one of:
a threshold count of beam changes since a last connection release message is received;
a threshold count of beam changes during a period of time before selecting one of a small data transmission procedure and a connection establishment procedure for data transmission;
an indication that the count of beam changes is to be reported in a connection establishment procedure; or
an indication whether the configuration is valid for subsequent data transmission.

11. The device of claim 10, wherein the configuration for the metric of mobility is sent in at least one of a dedicated or broadcast signaling.

12. The device of claim 10, wherein the configuration for the metric of mobility includes:
the threshold count of beam changes since a last connection release message is received.

13. The device of claim 10, wherein the device is further caused to:
receive, from the further device, a connection establishment request message, the connection establishment request message indicating the count of beam changes.

14. The device of claim 10, wherein the device is further caused to:
receive, from the further device, a report of a connection establishment event that the count of beam changes is above a threshold count.

15. The device of claim 10, wherein the metric of mobility further comprises at least one of a count of cell changes or velocity.

16. A method comprising:
determining, in an inactive state, a metric of mobility;
selecting, based on the metric of mobility, one of a small data transmission procedure and a connection establishment procedure for data transmission; and
initiating the selected one of the small data transmission procedure and the connection establishment procedure for the data transmission,
wherein determining the metric of mobility comprises:
receiving an indication of a configuration for the metric of mobility; and
determining the metric of mobility based on the configuration, and
wherein the metric of mobility comprises a count of beam changes, and the configuration for the metric of mobility including at least one of:
a threshold count of beam changes since a last connection release message is received;
a threshold count of beam changes during a period of time before selecting one of a small data transmission procedure and a connection establishment procedure for data transmission;
an indication that the count of beam changes is to be reported in a connection establishment procedure; or
an indication whether the configuration is valid for subsequent data transmission.

17. The method of claim 16, wherein the configuration for the metric of mobility is received in at least one of dedicated or broadcast signaling.

18. The method of claim 16, wherein the configuration for the metric of mobility including:
the threshold count of beam changes since a last connection release message is received.

19. The method of claim 16, wherein determining the metric of mobility based on the configuration comprises:
counting beam changes within a single cell or over a plurality of cells.

20. The method of claim 16, wherein selecting the one of the small data transmission procedure and the connection establishment procedure comprises:
determining whether the count of beam changes is above a threshold count; and
in accordance with a determination that the count of beam changes is above the threshold count, selecting the connection establishment procedure for the data transmission.

21. The method of claim 20, wherein initiating the connection establishment procedure by initiating at least one of a resume procedure, an establishment procedure or a re-establishment procedure.

22. The method of claim 20, wherein initiating the connection establishment procedure comprises:
sending a connection establishment request message, the connection establishment request message indicating the count of beam changes.

23. The method of claim 20, further comprising:
logging a connection establishment event that the count of beam changes is above the threshold count.

24. The method of claim 16, wherein the metric of mobility further comprises at least one of a count of cell changes or velocity.

25. A method comprising:
determining a configuration of a metric of mobility to enable a device in an inactive state to select one of a small data transmission procedure and a connection establishment procedure for data transmission; and
sending, to the device, an indication of the configuration of the metric of mobility,
wherein the metric of mobility comprises a count of beam changes, and the configuration for the metric of mobility includes at least one of:
a threshold count of beam changes since a last connection release message is received;
a threshold count of beam changes during a period of time before selecting one of a small data transmission procedure and a connection establishment procedure for data transmission;
an indication that the count of beam changes is to be reported in a connection establishment procedure; or
an indication whether the configuration is valid for subsequent data transmission.

26. The method of claim 25, wherein the configuration for the metric of mobility is sent in at least one of a dedicated or broadcast signaling.

27. The method of claim 25, wherein the configuration for the metric of mobility includes:
 the threshold count of beam changes since a last connection release message is received.

28. The method of claim 25, further comprising:
 receiving, from the device, a connection establishment request message, the connection establishment request message indicating the count of beam changes.

\* \* \* \* \*